(12) United States Patent
Durand et al.

(10) Patent No.: US 10,830,582 B2
(45) Date of Patent: Nov. 10, 2020

(54) METHOD AND SYSTEM FOR COMPENSATING FOR ACCURACY ERRORS OF A HEXAPOD

(71) Applicant: MICRO-CONTROLE SPECTRA-PHYSICS, Evry (FR)

(72) Inventors: Eric Durand, Amilly (FR); Franck Duquenoy, Olivet (FR)

(73) Assignee: MICRO-CONTROLE SPECTRA-PHYSICS, Evry (FR)

( * ) Notice: Subject to any disclaimer, the term of this patent is extended or adjusted under 35 U.S.C. 154(b) by 305 days.

(21) Appl. No.: 15/767,571

(22) PCT Filed: Oct. 5, 2016

(86) PCT No.: PCT/FR2016/052552
§ 371 (c)(1),
(2) Date: Apr. 11, 2018

(87) PCT Pub. No.: WO2017/064392
PCT Pub. Date: Apr. 20, 2017

(65) Prior Publication Data
US 2018/0299267 A1    Oct. 18, 2018

(30) Foreign Application Priority Data

Oct. 15, 2015   (FR) ..................................... 15 59795

(51) Int. Cl.
*G05B 19/18*     (2006.01)
*G01B 21/04*    (2006.01)
(Continued)

(52) U.S. Cl.
CPC ............ *G01B 21/04* (2013.01); *B25J 9/0042* (2013.01); *B25J 9/1623* (2013.01);
(Continued)

(58) Field of Classification Search
CPC ...... G01B 21/04; G01B 5/0002; B25J 9/0042; B25J 17/0216; B25J 9/1623; G05B 19/31; G05B 2219/50053; G01D 5/34746
See application file for complete search history.

(56) References Cited

U.S. PATENT DOCUMENTS 9,279,658 B1 *   3/2016  Maffett .............. G01B 9/02049
9,545,697 B2 *   1/2017  Whinnem ............ B23Q 1/5462
(Continued)

FOREIGN PATENT DOCUMENTS

WO          99/28097 A1    6/1999

OTHER PUBLICATIONS

Written Opinion of the International Searching Authority dated Jan. 24, 2017, issued in International Application No. PCT/FR2016/052552, filed Oct. 5, 2016, 5 pages.
(Continued)

*Primary Examiner* — Masud Ahmed
(74) *Attorney, Agent, or Firm* — Christensen O'Connor Johnson Kindness PLLC

(57) ABSTRACT

A method for compensating for accuracy errors of a hexapod is disclosed, said hexapod comprising a base, an actuation assembly having six linear translation actuators, a control unit, and a movable carriage comprising a platform connected to the base by means of the actuation assembly. The method includes a measurement step for determining geometry and positioning errors on the hexapod, the measurement step including sub-steps for determining positioning errors of the pivot centers on the carriage and on the base, for determining length errors of the actuators and for measuring positioning errors of the actuators along the path thereof, the compensation method also including a step for calculating, from measurements taken, error compensation values and a step for applying said error compensation values to the
(Continued)

control unit of the hexapod, during subsequent use of said hexapod.

9 Claims, 4 Drawing Sheets

(51) Int. Cl.
    *B25J 9/16*         (2006.01)
    *B25J 9/00*         (2006.01)
    *B25J 17/02*       (2006.01)
    *G05B 19/31*      (2006.01)
    *G01D 5/347*      (2006.01)

(52) U.S. Cl.
    CPC .......... *B25J 17/0216* (2013.01); *G05B 19/31* (2013.01); *G01D 5/34746* (2013.01); *G05B 2219/50053* (2013.01)

(56) References Cited

U.S. PATENT DOCUMENTS

| | | | | |
|---|---|---|---|---|
| 9,694,455 B2* | 7/2017 | Brown | | B23Q 3/04 |
| 9,928,097 B1* | 3/2018 | Krottapalli | | G06F 16/2228 |
| 2010/0122602 A1* | 5/2010 | Marcroft | | B25J 17/0216 |
| | | | | 74/490.03 |
| 2011/0056074 A1* | 3/2011 | Jonas | | B23K 1/0016 |
| | | | | 29/829 |
| 2012/0323345 A1* | 12/2012 | Jonas | | G01B 21/045 |
| | | | | 700/57 |
| 2014/0263883 A1* | 9/2014 | Rushworth | | B25J 9/0057 |
| | | | | 248/163.1 |
| 2015/0321360 A1* | 11/2015 | Galipienzo Huguet | | ...... |
| | | | | B25J 17/0216 |
| | | | | 74/490.06 |
| 2016/0031080 A1* | 2/2016 | Rey | | B25J 9/08 |
| | | | | 74/490.05 |

OTHER PUBLICATIONS

International Preliminary Report on Patentabilily dated Apr. 17, 2018, issued in International Application No. PCT/FR2016/052552, filed Oct. 5, 2016, 1 page.

International Search Report dated Jan. 24, 2017, issued in International Application No. PCT/FR2016/052552, filed Oct. 5, 2016, 3 pages.

Lin, P.D. et al., "Passive and Active Error Compensation of Multi-Axis Machines," Proceedings of the World Congress on Intelligent Manufacturing Processes and Systems, vol. 2, pp. 1105-1116, Feb. 13, 1995.

* cited by examiner

METHOD AND SYSTEM FOR COMPENSATING FOR ACCURACY ERRORS OF A HEXAPOD

The present invention relates to a method and system for compensating for accuracy errors of a hexapod.

It is known that a hexapod comprises a kinematic structure composed of two platforms, a base platform and a top platform, and six actuators. The base platform is fixed, while the top platform (or moveable carriage) and the six actuators are moveable. The actuators are linked by a first extremity to the top platform by means of a hinge, the other extremity of each actuator being linked to the base by means of another hinge. All the actuators are independent of one another and allow the top platform to be directed and positioned.

The hexapod is therefore a parallel mechanical system which permits the positioning and moving of objects in space in accordance with the six degrees of freedom. The architecture of the system allows it to be used for highly accurate positioning, position measurement, as well as the generation of movements within the framework of tests in dynamics.

Hexapods notably find their uses in the naval, space, aeronautic, motor, optical, medical, nuclear, and electronic industries, and so on.

Although hexapods generally have satisfactory accuracy on their axes, there still appears to be a certain level of error.

The object of the present invention is to remedy this inconvenience, by planning to compensate for accuracy errors.

It relates to a method for compensating for accuracy errors of a hexapod, said hexapod comprising at least:
  a fixed base;
  an actuation assembly equipped with six independent, controllable linear translation actuators;
  an actuation assembly control unit; and
  a moveable carriage comprising a platform linked to the base by means of the actuation assembly, each of said actuators of the actuation assembly being linked by a first longitudinal extremity to the base by means of a first hinge and by the second longitudinal extremity to the carriage by means of a second hinge, said six actuators defining six pivot centres (or points) on the base and six pivot centres (or points) on the carriage.

In accordance with the invention, said method is remarkable in that it comprises:
  a measurement step consisting of determining geometry and positioning errors on the hexapod, the measurement step including:
    a first sub-step consisting of measuring the position of each of the pivot centres on the carriage and each of the pivot centres on the base, to determine positioning errors of the pivot centres, and to measure the length of each of the actuators, to determine length errors of said actuators; and
    a second sub-step consisting of measuring positioning errors of each of the actuators along their path;
  a calculation step to calculate, from the measurements taken during the measurement step, error compensation values; and
  an application step consisting of applying the error compensation values to the control unit of the hexapod, during use of the latter.

Thus, thanks to the invention, it is possible to determine and compensate for different types of errors (of geometry and positioning) susceptible to appearing on the hexapod, so as to have a particularly precise hexapod (with a very precise movement and control of the moveable carriage with regard to the fixed base) during subsequent use of the hexapod.

In a first embodiment, said first sub-step is a unique sub-step, and it consists of:
  direct measurement of the positions of each of the pivot centres on the carriage and each of the pivot centres on the base; and
  direct measurement of the length of each of the actuators, to determine length errors of said actuators.

In this first embodiment, the hexapod must have a geometry allowing such direct measurements.

In addition, in a second embodiment, said first sub-step comprises multiple individual sub-steps detailed below.

Advantageously, the first measurement sub-step comprises a first individual sub-step consisting of measuring the positions of each of the pivot centres on the base, said first individual sub-step consisting of, for measuring the positions of the pivot centres of the base:
  fastening the balls onto the base at the position of the pivot centres;
  fastening the base onto a rectifier plate; and
  measuring the position of the balls with the aid of a 3D measurement device.

Moreover, advantageously, the calculation step comprises a sub-step consisting of comparing the measured values of the positions of the pivot centres (on the base) to corresponding theoretical values and to construct a compensation matrix of geometry errors of the base, In addition, advantageously, the first measurement sub-step comprises a second individual sub-step consisting of measuring the positions of each of the pivot centres on the carriage, said second individual sub-step consisting of, for measuring the positions of the pivot centres on the carriage:
  fastening the balls onto the carriage at the position of the pivot centres;
  fastening the carriage onto a rectifier plate; and
  measuring the position of the balls with the aid of a 3D measurement device.

Further, advantageously, the calculation step comprises a sub-step consisting of comparing the measured values of the positions of the pivot centres (on the carriage) to corresponding theoretical values and to construct a compensation matrix of the geometry errors of the carriage.

Moreover, advantageously, the first measurement sub-step comprises a third individual sub-step consisting of measuring the length of each of the actuators, said third individual sub-step consisting of measuring, for each actuator, with a 3D measurement device, the length of the actuator between the balls of the centres of the actuator, with the original actuator.

In addition, advantageously, the calculation step comprises a sub-step consisting of comparing the measured values of the lengths of the actuators to corresponding theoretical values and of constructing a compensation matrix of the length errors of the actuators.

In addition, advantageously, the calculation step comprises a sub-step consisting of using the measured values of the positioning errors to construct a compensation matrix of the positioning errors.

The present invention also relates to a system for compensating for accuracy errors of a hexapod, as above.

In accordance with the invention, said compensation system comprises:
  a measurement system configured to determine geometry and positioning errors on the hexapod, the measurement system comprising:

a first measurement assembly configured to measure the positions of each of the pivot centres on the carriage and each of the pivot centres on the base, in order to determine the positioning errors of the pivot centres, and to measure the length of each of the actuators, in order to determine the length errors of said actuators; and a second measurement assembly configured to measure the positioning errors of each of the actuators along their path; and a calculation unit configured to calculate, based on these measurements, compensation error values, the compensation error values being applied to the control unit of the hexapod during a (subsequent) use of the latter.

In a specific embodiment, said first measurement assembly comprises:

a measurement assembly configured to measure the positions of each of the pivot centres on the carriage and each of the pivot centres on the base, in order to determine the positioning errors of the pivot centres; and a second measurement assembly configured to measure the length of each of the actuators.

The appended figures will clearly explain how the invention can be implemented. In these figures, identical references indicate similar elements.

Figure 1:
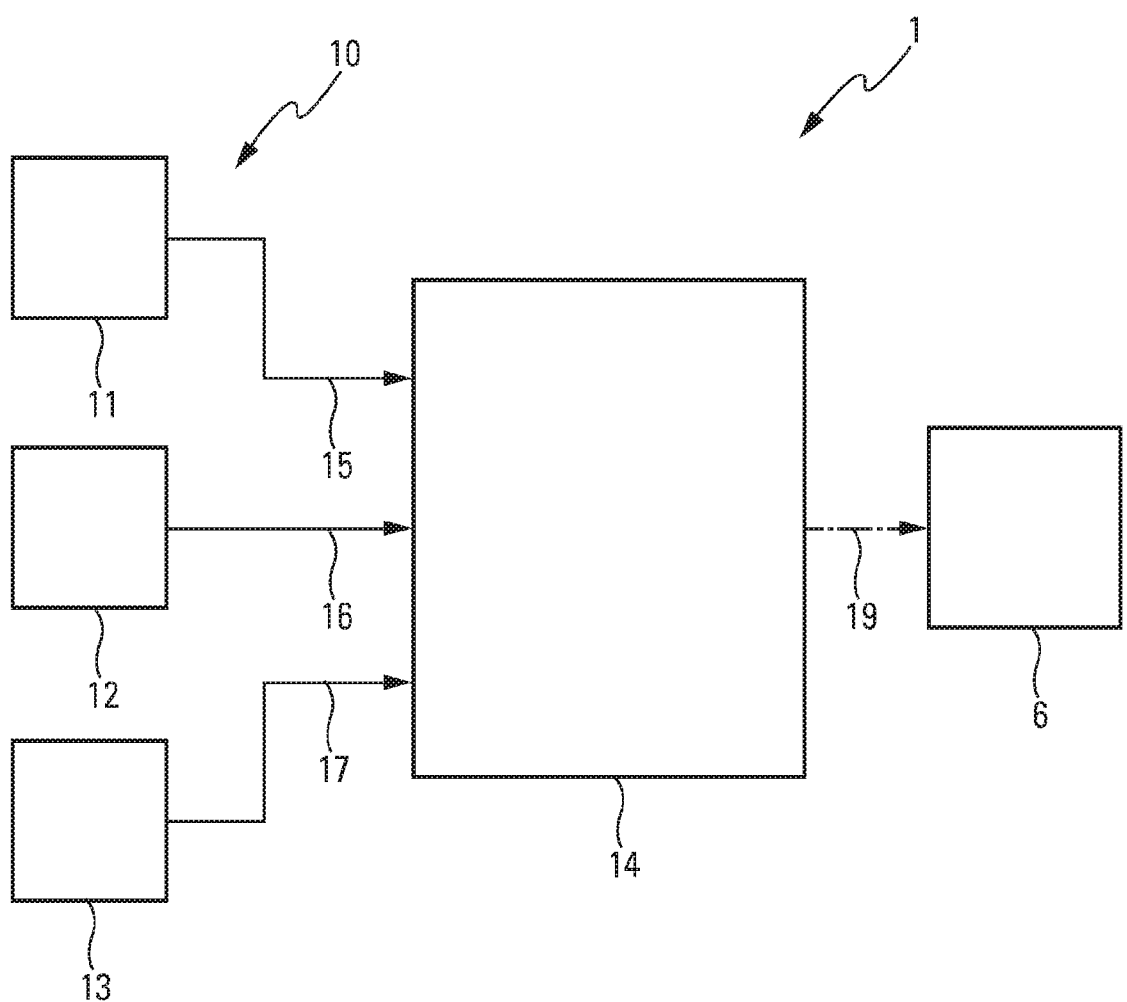
FIG. 1 is the synoptic plan of a specific embodiment of a system for compensating for accuracy errors.
Figure 2:
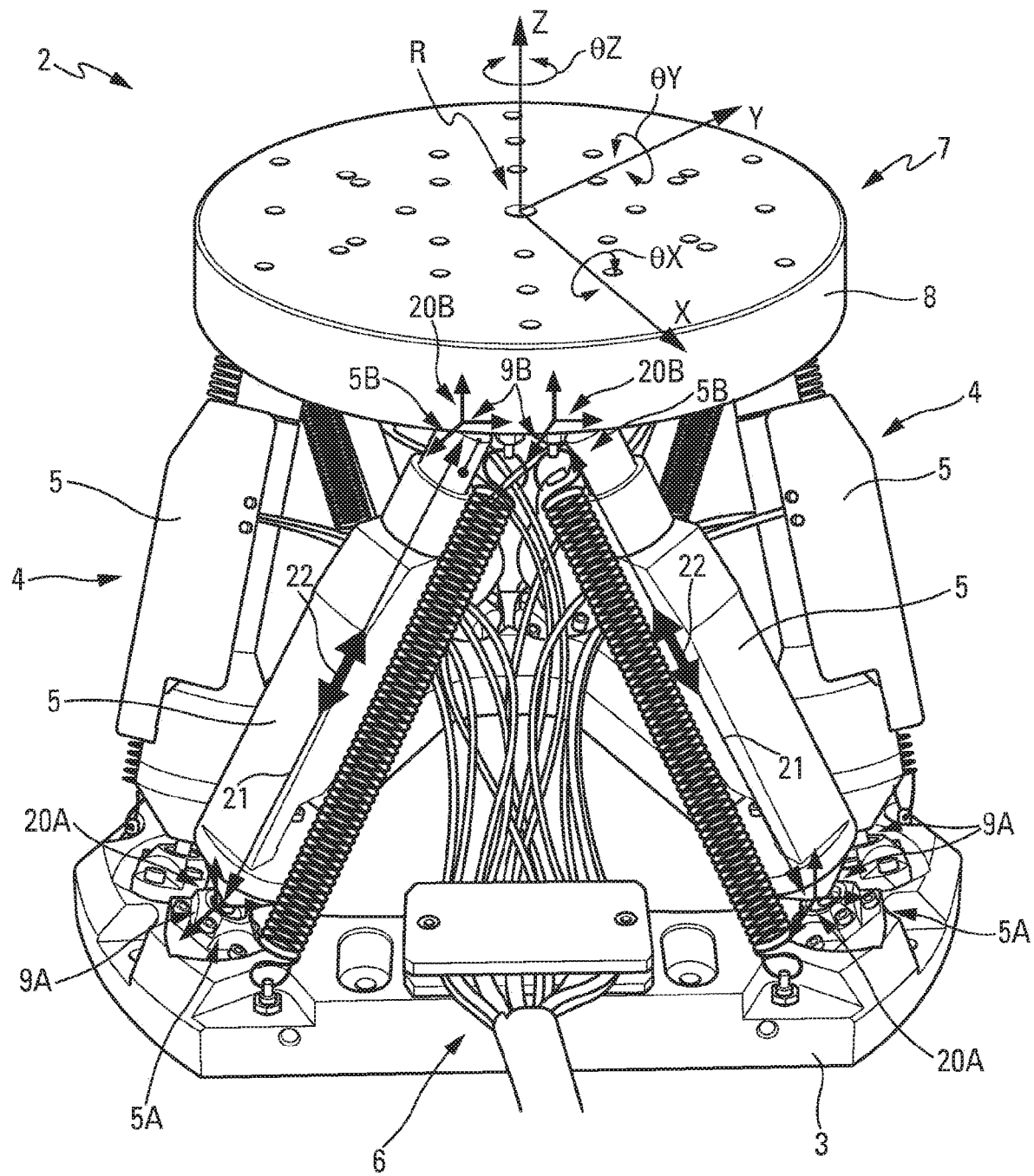
FIG. 2 is a perspective view of a hexapod on which the invention has been used.

System 1 (hereafter "compensation system 1") represented schematically in FIG. 1 and allowing the invention to be illustrated, is a system for compensating for accuracy errors on a hexapod 2 as shown, by way of illustration, in FIG. 2.

As is standard, the hexapod 2 comprises:
a fixed base 3;
an actuation assembly 4 equipped with six linear translation actuators 5, which are independent of each other, and whose length is variable and controllable;
a control unit 6 (not specifically represented) to control the actuation assembly 4; and
a moveable carriage 7 comprising a platform 8 connected to the base 3 by means of the actuation assembly 4.

Each of the six actuators 5 of the actuation assembly 4 are linked by a first longitudinal extremity 5A to the base 3 by means of a first hinge 9A and by a second longitudinal extremity 5B to the platform 8 of the moveable carriage 7 by means of a second hinge 9B. The hinges 9A and 9B represent balls with two or three degrees of freedom. The six actuators 5 also define six pivot centres (or points) on the base 3 and six pivot centres (or points) on the platform 8.

The hexapod 2 thus comprises six legs, each leg comprising an actuator 5, the lengthening of which allows the length of the leg to be varied.

The two plates (base plate 3 and platform 8) are arranged substantially parallel to an XY plane (horizontal) defined by a direction referred to as X and a direction referred to as Y. In a neutral position of said plates 3 and 8, they are both completely parallel to the XY plane.

These X and Y directions form part of a point of reference R (or XYZ) which is represented in FIG. 2. This point of reference R intended to facilitate understanding comprises, as well as directions (or axes) X and Y forming the XY plane, a direction (or axis) Z which is orthogonal to said XY plane, together with angles $\theta X$, $\theta Y$, and $\theta Z$ (identified by double arrows), which illustrate the rotations, respectively, along the axes X, Y and Z.

The base 3 may be fixed, as is standard, on a supporting element (not represented) by means of attachment, such as screws.

As for the moveable carriage 7, it can bear, as is standard, specific elements (not represented) which can be fixed onto it, by means of attachment, such as screws.

The hexapod 2 is particularly well adapted to position or move mechanical or optical parts in six degrees of freedom, specifically to position samples in spectrography, for alignment of fibre optics in optoelectronics, or for alignment of optics.

The actuation assembly 4 is thus configured to allow the moveable carriage 7 to move with regard to the base 3. To be more precise, the actuation assembly can generate:
a relative movement in accordance with the X axis and/or along ($\theta X$) the latter; and/or
a relative movement in accordance with the Y axis and/or along ($\theta Y$) the latter; and/or
a relative movement in accordance with the Z axis and/or along ($\theta Z$) the latter.

The hexapod 2 also possesses six degrees of freedom: three degrees of freedom in translation (in accordance with axes X, Y and Z), as well as three degrees of freedom in rotation (in accordance with angles $\theta X$, $\theta Y$, and $\theta Z$).

The six actuators 5 are activated (by the control unit 6) in order to change length and additionally to vary the orientation of the moveable carriage 7 (with regard to the fixed base 3). A given position of the moveable carriage 7 corresponds to a unique combination of the six lengths of the six actuators 5.

The base 3, the moveable carriage 7 and the actuators 5 are thus linked by the twelve pivot centres (six on the base and six on the moveable carriage 7), and the length control of each actuator 5 allows the moveable carriage 7 of the hexapod 2 to be moved along or in accordance with axes X, Y and Z.

In accordance with the invention, the compensation system 1 comprises, as is illustrated in FIG. 1:
a measurement system 10 configured to determine geometry and positioning errors on the hexapod 2, the measurement system 10 comprising:
a measurement assembly 11 configured to measure the positions of each of the pivot centres 9A on the base 3 and each of the pivot centres 9B on the carriage 7, in order to determine positioning errors of the pivot centres 9A and 9B;
a measurement assembly 12 configured to measure the length of each of the actuators 5, in order to determine the length errors of said actuators 5; and
a measurement assembly 13 configured to measure the positioning errors of each of the actuators 5 along their path; and
a calculation unit which is linked by bonds 15 to 17 respectively to the measurement assemblies 11 to 13 and which is configured to calculate, from the measurements made by these measurement assemblies 11 to 13, error compensation values.

The error compensation values are applied to the control unit 6 of the hexapod 2 during use of the latter, as is illustrated by a dotted line arrow 19 in FIG. 1.

The positioning accuracy of the carriage 7 following axes X, Y, Z, U, V and W depends largely on the three following elements:

the accuracy of the position of each of the pivot centres 9A and 9B, as illustrated by arrows 20A and 20B in FIG. 2;

the accuracy of the initial (original) length measurement of each of the actuators 5 (or legs), as illustrated by arrows 21 in FIG. 2; and the accuracy of the positioning of each of the actuators 5, as illustrated by arrows 22 in FIG. 2.

The compensation system 1 allows the precision of the positioning of the hexapod 2 to be improved by compensating for the three types of errors mentioned above.

The compensations are of mathematical type and are supported by the control unit 6 (or controller) which allows the hexapod 2 to be managed. This accomplishes:

compensation of positioning errors of the pivot centres 9A and 9B of the base 3 and the carriage 7 with regard to the definition of the theoretical geometry;

compensation of original length of each of the actuators 5; and compensation of positioning errors of each of the actuators 5.

To apply the compensations, the measurement unit 10 implements measurements which input data of calculations implemented by the calculation unit 14, the results of which are transmitted to the control unit 6.

The implementation technology of the pivots, used on the hexapod 2, allows these measurements to be implemented.

Figure 3:
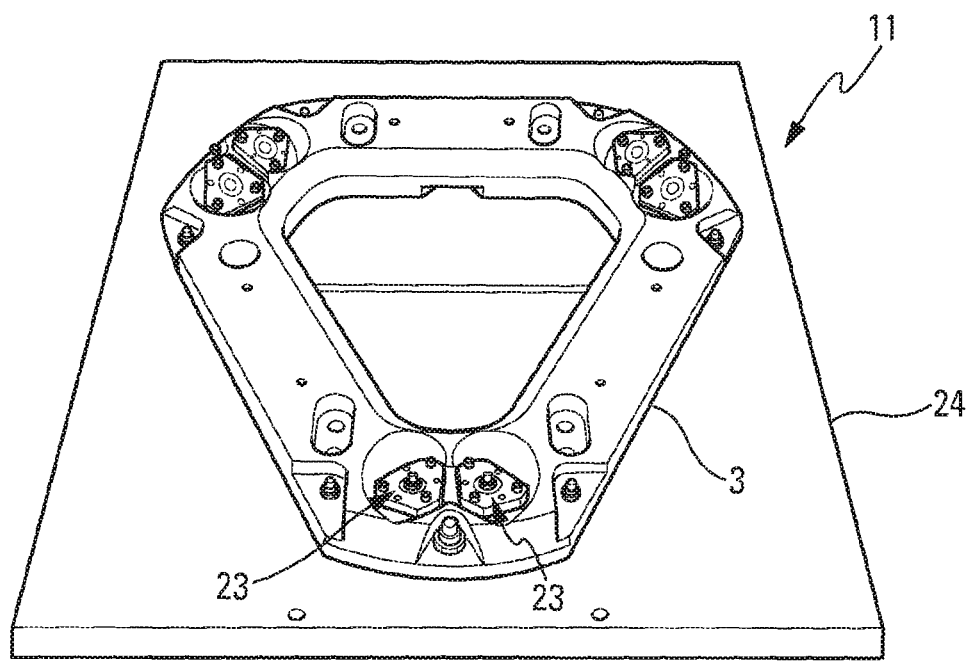
FIGS. 3 to 6 are perspective views of the measurement systems for compensating for errors.

In an exemplary embodiment, to measure the positions of the pivot centres on the base 3, the following operations will be implemented:

the balls 23 (for example, ceramic or another material) are fastened, for example adhesively or using another method, to the base 3 in the position of the pivot centres, as is represented in FIG. 3;

the base 3 is fastened to a rectifier plate 24; and the position of the balls 23 is measured with the aid of a 3D measurement device (not represented).

The rectifier plate 24 and the measurement device form part of the measuring assembly 11.

In a variation of an embodiment, the measurement system 10 implements a direct measurement of the pivot centres on the base.

In this case, the calculation unit 14 compares the values of the positions of the pivot centres, measured in the aforementioned manner and received from the measurement assembly 11, to the saved corresponding theoretical values, and constructs a compensation matrix of the geometry errors of the base 3.

This matrix is transmitted to the control unit 6.

Figure 4:
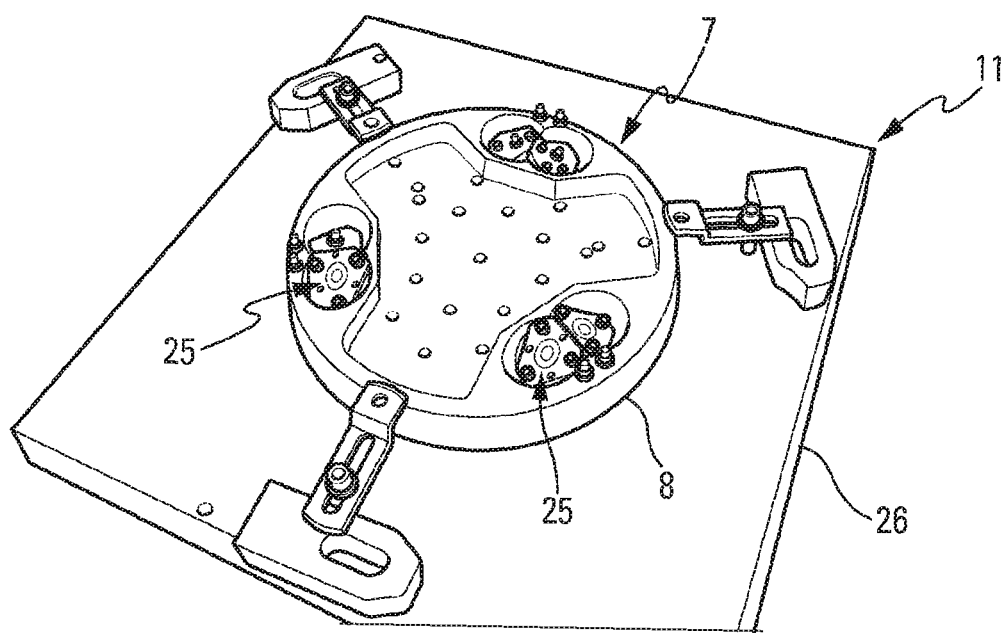

In addition, to measure the positions of the pivot centres on the carriage 7, the following operations are implemented:

the balls 25 (for example, ceramic or another material) are fastened to the carriage 7 in the position of the pivot centres, as is illustrated in FIG. 4;

the carriage 7 is fixed to a rectifier plate 26; and the position of the balls 25 is measured with the aid of a 3D measurement device (not represented).

The rectifier plate 26 and the measurement device form part of the measuring assembly 12.

In a variation of an embodiment, the measurement system 10 implements a direction measurement of the pivot centres on the base.

In this case, the calculation unit 14 compares the values of the positions of the pivot centres, measured in the aforementioned manner and received from the measurement assembly 12, to the saved corresponding theoretical values, and constructs a compensation matrix of the geometry errors of the carriage.

This matrix is transmitted to the control unit 6.

Preferably, the calculation unit 14 determines a single compensation matrix from the two previous matrices for all twelve pivot centres. This compensation matrix thus also includes twelve XYZ coordinates.

In a variation of an embodiment, the pivot centres and actuator lengths are measured in a single step on an assembled hexapod, the hexapod having been designed to allow this direct measurement.

In addition, to measure the length of each of the actuators 5, the length of the actuator is measured, for each actuator 5, between the pivot centres of the actuator 5, with the actuator 5 in the initial position of minimal length, using a 3D measurement device.

Figure 5:
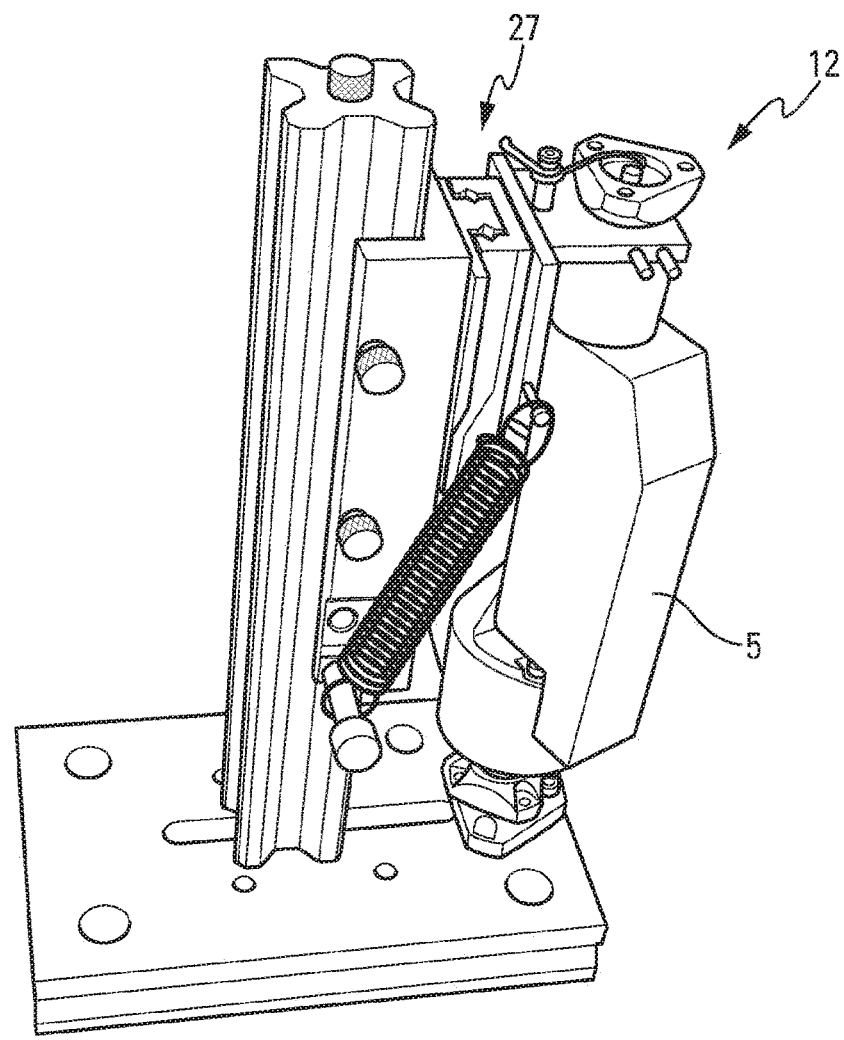

More specifically, the distance between the centre of two balls (for example, ceramic or another material) is measured using a 3D measurement device 27 while the actuator 5 is at the origin (length of legs), as is illustrated in FIG. 5.

The lower pivot of this equipment is maintained in an identical manner to those mounted on the base and on the carriage of the hexapod. The ball is fixed, for example adhesively. The axis of the tip of the actuator is maintained in three centres and the actuator is loaded, in its initial position, with a force of 20N applied by a spring which follows an axis defined by the translation stage. The upper pivot ball is arranged in the pivot cup of the actuator tip. It is maintained by a spring system which ensures its immobilisation during the measurement phase.

The measurement is implemented in four successive steps:

measuring the centre position of the lower ball (actuator not assembled) and tracking the position of a corner of the support plate;

assembling the actuator and positioning the upper ball;

measuring the centre position of the upper ball; and verifying the position of the corner of the plate (to confirm that it has not moved during the placement of the actuator on the equipment).

In this case, the calculation unit 14 compares the measured values of the positions of the lengths of the actuators 5 to corresponding theoretical values, and constructs a compensation matrix of the length errors of the actuators.

Figure 6:
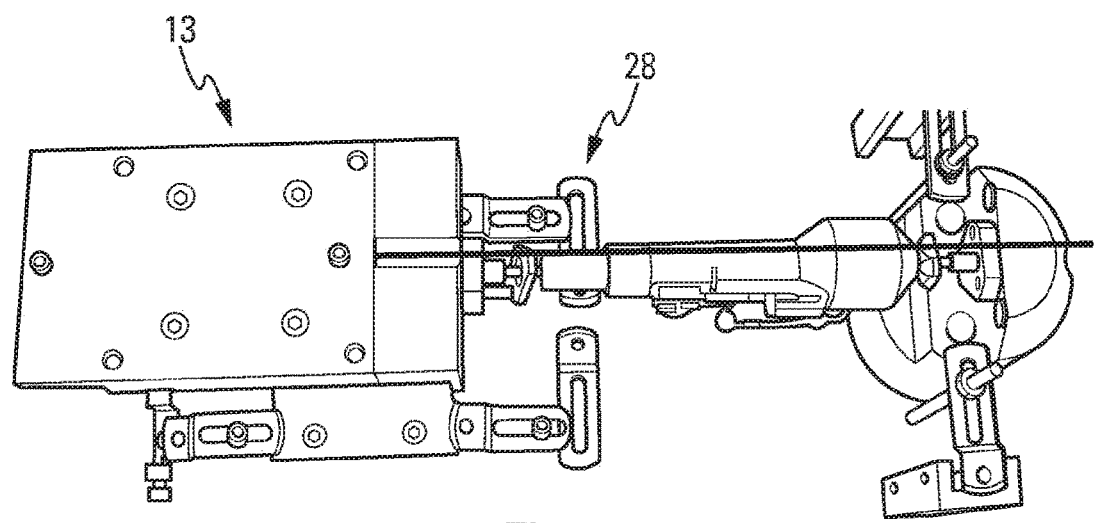

Furthermore, to measure the positioning errors of each of the actuators 5 along their path, it is preferable to use the device 28 represented in FIG. 6.

In this case, the calculation unit 14 uses the measured values of the positioning errors of the actuators, to construct a compensation matrix of positioning errors.

Thus, the implementation of the invention has two phases:

a first phase during which the different measurements as described above are implemented, then the error (or disparity) calculations preferably in the form of a compensation matrix are performed; and a second phase, during which the hexapod 2 is used as normal to carry out standard operations. In this case, the calculated errors (or disparities) are integrated in advance in one or some standard algorithms into the control unit 6 (or controller) which takes them into account when determining the movements of the moveable carriage 7 with regard to the fixed base 3, with the object of compensating for these errors.

This results in a hexapod 2 having particularly precise, controlled movements between the moveable carriage 7 and the base 3.

The invention claimed is:

1. A method for compensating for accuracy errors of a hexapod, said hexapod comprising at least:
 a fixed base;
 an actuation assembly equipped with six independent, controllable linear translation actuators;
 a control unit for the actuation assembly; and
 a moveable carriage comprising a platform connected to the base by the actuation assembly, each of said actuators of the actuation assembly being linked by a first longitudinal extremity to the base by a first hinge and by a second longitudinal extremity to the carriage by a second hinge, said six actuators defining six pivot centres on the base and six pivot centres on the carriage, said method comprising:
 measuring geometry and positioning errors on the hexapod, said measuring including:
 measuring the positions of each of the pivot centres on the carriage and each of the pivot centres on the base, to determine the positioning errors of the pivot centres, and measuring the length of each of the actuators, to determine the length errors of said actuators,
 wherein said measuring the positions of each of the pivot centres on the carriage and each of the pivot centres on the base includes fastening the balls onto the base at the position of the pivot centres, fastening the base to a rectifier plate; and measuring the position of the balls with the help of a 3D measurement device, and includes fastening the balls to the carriage in the position of the pivot centres, fastening the carriage to a rectifier plate; and measuring the position of the balls with the aid of a 3D measurement device; and
 measuring the positioning errors of each of the actuators along their path;
 calculating, from the measurements made during the measurement step, error compensation values; and
 applying the error compensation values to the control unit of the hexapod, during use of the latter.

2. The method according to claim 1, wherein said calculating comprises comparing the measured values of the positions of the pivot centres to corresponding theoretical values and of constructing a compensation matrix of the geometry errors of the base.

3. The method according to claim 1, wherein said calculating includes comparing the measured values of the positions of the pivot centres to corresponding theoretical values and of constructing a compensation matrix of the geometry errors of the carriage.

4. The method according to claim 1, wherein said measuring the positions of each of the pivot centres on the carriage and each of the pivot centres on the base includes measuring, for each actuator, with a 3D measurement device, the length of the actuator between the centres of the balls of the actuator, with the original actuator.

5. The method according to claim 4, wherein said calculating includes comparing the measured values of the lengths of the actuators to corresponding theoretical values and of constructing a compensation matrix of the lengths errors of the actuators.

6. The method according to claim 1, wherein said measuring the positions of each of the pivot centres on the carriage and each of the pivot centres on the base consists of, simultaneously:
 directly measuring the positions of each of the pivot centres on the carriage and each of the pivot centres on the base; and
 directly measuring the length of each of the actuators, to determine length errors of said actuators.

7. The method according to claim 1, wherein said calculating includes using the measured values of the positioning errors of the actuators to construct a compensation matrix of positioning errors.

8. A system for compensating for accuracy errors of a hexapod, said hexapod comprising:
 a fixed base;
 an actuation assembly equipped with six independent, controllable linear translation actuators;
 a control unit for the actuation assembly; and
 a moveable carriage comprising a platform linked to the base by the actuation assembly, each of said actuators of the actuation assembly being linked by a first longitudinal extremity to the base by a first hinge and by the second longitudinal extremity to the carriage by a second hinge, said six actuators defining six pivot centres on the base and six pivot centres on the carriage, said compensation system comprising:
 a measurement system configured to determine geometry and positioning errors on the hexapod, the measurement system comprising:
 a first measurement assembly configured to measure the positions of each of the pivot centres on the carriage and each of the pivot centres on the base, in order to determine positioning errors of the pivot centres, and to measure the length of each of the actuators, in order to determine length errors of said actuators; and
 a second measurement assembly configured to measure positioning errors of each of the actuators along its path; and
 a calculation unit configured to calculate, from these measurements, error compensation values, the error compensation values being applied to the control unit of the hexapod during a use of the latter.

9. The system according to claim 8, wherein said first measurement assembly comprises:
 a measurement assembly configured to measure the positions of each of the pivot centres on the carriage and each of the pivot centres on the base, in order to determine positioning errors of the pivot centres; and
 a second measurement assembly configured to measure the length of each of the actuators.

* * * * *